United States Patent [19]

Nigrin

[11] 4,282,035
[45] Aug. 4, 1981

[54] LEAD-FREE AND CADMIUM-FREE FRITS
[75] Inventor: Jaroslava M. Nigrin, Corning, N.Y.
[73] Assignee: Corning Glass Works, Corning, N.Y.
[21] Appl. No.: 121,745
[22] Filed: Feb. 15, 1980
[51] Int. Cl.$^3$ ............................ C03C 3/08; C03C 5/00
[52] U.S. Cl. .......................................... 106/48; 106/54
[58] Field of Search ...................................... 106/48, 54

[56] References Cited
U.S. PATENT DOCUMENTS

| | | | |
|---|---|---|---|
| 3,703,390 | 11/1972 | Girard et al. | 106/54 |
| 3,904,423 | 9/1975 | Guthrie | 106/54 |
| 3,932,312 | 1/1976 | Kazmierowicz | 106/54 |
| 4,084,976 | 4/1978 | Hinton | 106/48 |
| 4,120,733 | 10/1978 | Knapp | 106/54 |
| 4,194,807 | 3/1980 | Gliemeroth | 106/54 |

Primary Examiner—O. R. Vertiz
Assistant Examiner—Mark Bell
Attorney, Agent, or Firm—Clinton S. Janes, Jr.

[57] ABSTRACT

The instant invention is directed to the production of essentially lead-free and cadmium-free frits which are eminently suitable for the production of decorative glazes and enamels to be used with glass, glass-ceramic, and ceramic articles. The frits exhibit good glass stability, demonstrate coefficient of thermal expansion (20°–300° C.) between about $52$–$65 \times 10^{-7}$/°C., display excellent resistance to attack by acids and bases, and can be fired to fusion at temperatures between about 850°–1100° C. The compositions thereof consist essentially, expressed in weight percent on the oxide basis as calculated from the batch, of

| | |
|---|---|
| $SiO_2$ | 51–60 |
| $B_2O_3$ | 4.5–8 |
| $BaO$ | 0–13 |
| $SrO$ | 0–18 |
| $BaO + SrO$ | 6–30 |
| $ZrO_2$ | 4–8 |
| $Al_2O_3$ | 5–8 |
| $Li_2O$ | 0–4 |
| $Na_2O$ | 0–5 |
| $K_2O$ | 0–5 |
| $Li_2O + Na_2O + K_2O$ | 1–5 |
| $MgO$ | 0–6 |
| $CaO$ | 0–12 |
| $Bi_2O_3$ | 0–10 |
| $MgO + CaO + Bi_2O_3$ | 0–20 |

2 Claims, No Drawings

LEAD-FREE AND CADMIUM-FREE FRITS

BACKGROUND OF THE INVENTION

U.S. application Ser. No. 121,744, filed concurrently herewith by the present applicant under the same title, discusses the hazards of lead and cadmium release from glazes and enamels containing those ingredients and describes frit compositions which are essentially free from those elements. Those frits consist essentially, in weight percent on the oxide basis, of

| | |
|---|---|
| $SiO_2$ | 35–47 |
| $B_2O_3$ | 5.5–9 |
| BaO | 24–42 |
| $TiO_2$ | 1.5–4 |
| $ZrO_2$ | 6–10 |
| $Li_2O$ | 1–5 |
| MgO | 0–5 |
| SrO | 0–8 |
| CaO | 0–4 |
| ZnO | 0–10 |
| $Bi_2O_3$ | 0–8 |
| SrO + MgO + CaO + ZnO + $Bi_2O_3$ | 0–10 |

Those frits demonstrate a coefficient of thermal expansion (20°–300° C.) between about $65-75 \times 10^{-7}$/°C., a viscosity suitable for firing at about 700°–950° C., and excellent resistance to attack by acids and bases.

U.S. Ser. No. 121,744 also enumerates four vital criteria that must be exhibited by glazes and enamels and cited an optional characteristic which is required when a transparent, highly glossy decorative coating is desired:

First, the firing or maturing temperature of the frit, i.e., the temperature at which the frit will flow sufficiently to produce a smooth homogeneous coating, must be low enough to preclude thermal deformation of the substrate being coated;

second, the coefficient of thermal expansion of the frit must be compatible with that of the ware being coated to inhibit crazing and/or spalling with the most advantageous circumstance contemplating a coefficient of thermal expansion somewhat less than that of the substrate, whereby the fired coating will be placed in a state of compression when the ware is cooled to room temperature;

third, the frit must display excellent resistance to attack by acids and bases since corrosion of the coating can lead to loss of gloss, the development of haze and/or iridescence, the formation of porosity, or other effects detrimental to the appearance or physical character of the coating;

fourth, the frit must manifest good glass stability, i.e., the frit must resist devitrification during maturing; and fifth, if a glossy decorative glaze or enamel is desired, the refractive index of the frit must be sufficiently high to produce a clear high gloss in the coating.

With regard to chemical durability, where the glaze or enamel is to be utilized in food service applications, viz, as culinary ware and tableware, it must resist attack by acids present in foods and by detergents such as are employed with commercial dishwashers.

OBJECTIVES OF THE INVENTION

The principal objective of the subject invention is to produce frit compositions essentially free from cadmium and lead which will satisfy the above-cited first four criteria and, where desired, will be useful as glossy decorative materials.

Another objective of the instant invention is to produce frits which are especially applicable for coating food service ware.

SUMMARY OF THE INVENTION

I have discovered that frits fulfilling those objectives can be produced from compositions within the $R_2O$—$RO$—$Al_2O_3$—$ZrO_2$—$SiO_2$ system wherein $R_2O$ consists of $Li_2O + Na_2O + K_2O$ and RO consists of $SrO + BaO$. MgO, CaO, and/or $Bi_2O_3$ may also advantageously be present. Thus, compositions included within the operable limits of the inventive frits consist essentially, expressed in weight percent on the oxide basis as calculated from the batch, of:

| | |
|---|---|
| $SiO_2$ | 51–60 |
| $B_2O_3$ | 4.5–8 |
| BaO | 0–13 |
| SrO | 0–18 |
| BaO + SrO | 6–30 |
| $ZrO_2$ | 4–8 |
| $Al_2O_3$ | 5–8 |
| $Li_2O$ | 0–4 |
| $Na_2O$ | 0–5 |
| $K_2O$ | 0–5 |
| $Li_2O + Na_2O + K_2O$ | 1–5 |
| MgO | 0–6 |
| CaO | 0–12 |
| $Bi_2O_3$ | 0–10 |
| MgO + CaO + $Bi_2O_3$ | 0–20 |

Frits prepared from those compositions demonstrate good glass stability, firing (fusing or maturing) temperatures between about 850°–1100° C., coefficients of thermal expansion (20°–300° C.) ranging between about $52-65 \times 10^{-7}$/°C., excellent resistance to attack by acids and alkalies, in particular attack by detergents of the type utilized in commercial dishwashers, and, where desired, can have sufficiently high indices of refraction to impart high gloss to the resulting glazes and enamels.

When compared with companion application Ser. No. 121,744, it is apparent that the instant frits are somewhat harder, i.e., have a higher firing or maturing temperature, resulting from the obvious differences in composition. Hence, the content of BaO and/or SrO is reduced, that of $SiO_2$ increased, and $Al_2O_3$ is a required component. Those compositional modifications also yield frits with generally lower coefficients of thermal expansion. Again, however, the inclusion of $ZrO_2$ is primarily responsible for the exceptional chemical durability displayed by the inventive frits, especially the excellent resistance to the alkaline detergents customarily utilized in commercial dishwashers. It also, along with the BaO, contributes to securing a high index of refraction to the frit. The presence of $Al_2O_3$ and, less importantly, the increase in $SiO_2$ content also act to improve the chemical durability of the frits. Nevertheless, quantities of $ZrO_2$, $Al_2O_3$, and $SiO_2$ in excess of those recited above can raise the softening temperature and viscosity of the frits to a substantial extent, leading to the need for extensive alterations in the amounts of the other components to offset those increases. Hence, the desired combination of melting behavior and physical properties may be impossible to achieve.

The compositions of the inventive frits will preferably be restricted to the above-recited constituents in the indicated proportions. Nevertheless, the inclusion of very minor amounts of compatible metal oxides and fluoride may be tolerated to modify the melting behavior of the frits and/or the physical and chemical characteristics thereof. The total of all such extraneous additions will not exceed 5%. Examples of such optional ingredients include $TiO_2$ and $V_2O_5$ which perform in like manner to $ZrO_2$ in improving the chemical durability of the frits and raising the refractive indices thereof.

It will be appreciated, of course, that known pigments and colorants can be dissolved and/or suspended in the frits. The most widely-used colorants and pigments have been the transition metal oxides, e.g., CoO, NiO, MnO, $Fe_2O_3$, $Cr_2O_3$, and $V_2O_5$, although, more recently, rare earths such as praeseodymium, erbium, and neodymium have been employed. The content of colorant or pigment is customarily less than 20% and, in many instances, is less than 5%.

The most preferred frits will manifest coefficients of thermal expansion (20°–300° C.) of less than $60 \times 10^{-7}$/°C. and can be fired to mature glazes at temperatures between the interval of 850°–950° C. The low fusing temperatures and low coefficients of thermal expansion make them particularly advantageous for coating a large number of commercially-marketed glass, glass-ceramic, and ceramic food service articles since thermal deformation of those bodies is avoided and the fired glazes form a surface compression layer on such ware. The compositions of these most preferred frits consist essentially, expressed in weight percent on the oxide basis as calculated from the batch, of

| | |
|---|---|
| $SiO_2$ | 56–60 |
| $B_2O_3$ | 4.5–6.5 |
| BaO | 0–13 |
| SrO | 0–16 |
| BaO + SrO | 6–16 |
| $ZrO_2$ | 4.5–7 |
| $Al_2O_3$ | 5–7 |
| $Li_2O$ | 0–2 |
| $Na_2O$ | 0–3 |
| $K_2O$ | 0–2 |
| $Li_2O + 0 Na_2O + K_2O$ | 2–4.5 |
| MgO | 0–4 |
| CaO | 0–12 |
| MgO + CaO | 0–12 |

Prior Art

U.S. Pat. No. 4,084,976 describes lead-free glazes which are especially suitable for use with alumina bodies. Those glazes consisted essentially, in weight percent of:

| | |
|---|---|
| $SiO_2$ | 50–54 |
| $Al_2O_3$ | 5–8 |
| $B_2O_3$ | 6–12 |
| CaO | 4–6 |
| MgO | 2–8 |
| BaO | 2–5 |
| SrO | 5–8 |
| ZnO | 1–2 |
| $Li_2O + Na_2O + K_2O$ | 4–6 |

The working examples recited in the specification were fired at 1160° C. Such glazes, being lower in BaO, higher in $B_2O_3$, and free from $ZrO_2$, are beyond the purview of the inventive frits.

U.S. Pat. No. 4,120,733 is likewise directed to lead-free glazes suitable for use with alumina substrates and statedly describes glazes which are an improvement upon those set forth in U.S. Pat. No. 4,084,976, supra, in that they mature at temperatures about 80°–100° F. lower. The glazes consisted essentially, in weight percent, of:

| | |
|---|---|
| $SiO_2$ | 48–54 |
| $Al_2O_3$ | 7–11 |
| $B_2O_3$ | 16.5–20 |
| BaO | 11–14 |
| CaO | 2–3 |
| ZnO | 2–2.5 |
| $Na_2O$ | 4.25–5.25 |
| $K_2O$ | 0.4–1 |

The working examples discussed were fired at 1038°–1200° C. Such glazes, being much higher in $B_2O_3$ and $ZrO_2$-free, are outside the scope of the inventive compositions.

U.S. application Ser. No. 80,496, filed Oct. 1, 1979 in the name of Richard F. Reade, now U.S. Pat. No. 4,224,074 is drawn to frits which are free from lead and cadmium and have compositions within the $R_2O$—$Al_2O_3$—$B_2O_3$—$ZrO_2$—$SiO_2$—F field, wherein $R_2O$ consists of $Na_2O$ with, optionally, $Li_2O$. Such frits, being free from BaO and/or SrO and requiring the presence of fluoride, are not suggestive of the inventive compositions.

DESCRIPTION OF THE PREFERRED EMBODIMENTS

Table I records several frit compositions, expressed in parts by weight on the oxide basis as calculated from the batch, illustrating the parameters of the subject invention. Because the total of individual components equals or closely approximates 100, for all practical purposes the various constituents can be deemed to be reported in terms of weight percent. The actual batch ingredients utilized may be any materials, either the oxide or other compound, which, when melted together in concert with the other components, will be converted into the desired oxide in the proper proportions. Because it is not known with which cation(s) the fluoride ion is combined, it is merely reported in terms of fluoride in accordance with conventional glass analysis practice.

Batches for the exemplary compositions of Table I were compounded to yield the indicated oxide proportions and ballmilled to promote a homogeneous melt. Each batch was placed into a platinum crucible and the crucible introduced into a furnace operating at 1400° C. After melting for about four hours, one portion of the melt was poured into a glass slab having dimensions of about 6"×2"×0.375" and that slab was immediately transferred to an annealer operating at about 600° C. The remainder of the molten batch was run as a fine stream into a bath of water (drigaged) to produce finely-divided glass particles which, after drying, were dry ballmilled to pass a No. 325 U.S. Standard Sieve (44 microns).

Table I also records the softening point (Soft.), annealing point (Ann.), each reported in °C., and coefficients of thermal expansion (Exp.) over the range 20°–300° C., stated in terms of $\times 10^{-7}$/°C., as determined from the above-described glass slabs. Each of these determinations was obtained employing measuring techniques conventional in the glass art.

TABLE I

| 1 | 2 | 3 | 4 | 5 | 6 | 7 |
|---|---|---|---|---|---|---|

TABLE I-continued

| | | | | | | | |
|---|---|---|---|---|---|---|---|
| $SiO_2$ | 56.10 | 56.70 | 56.83 | 56.80 | 57.43 | 57.96 | 58.51 |
| $Al_2O_3$ | 6.10 | 6.17 | 6.18 | 6.25 | 6.32 | 6.37 | 6.34 |
| $B_2O_3$ | 5.47 | 5.53 | 5.54 | 5.54 | 5.60 | 5.66 | 5.71 |
| $ZrO_2$ | 6.02 | 6.09 | 6.10 | 6.05 | 6.12 | 6.17 | 6.23 |
| BaO | 12.39 | 12.53 | 12.55 | 12.51 | 12.65 | 12.77 | — |
| SrO | — | — | — | — | — | — | 8.72 |
| CaO | 9.84 | 9.95 | 9.97 | 5.03 | 5.08 | 5.13 | 10.10 |
| MgO | — | — | — | 3.58 | 3.62 | 3.65 | — |
| $Na_2O$ | 2.49 | 2.52 | — | 2.56 | 2.59 | — | 2.69 |
| $K_2O$ | 1.59 | — | 1.61 | 1.62 | — | 1.65 | 1.66 |
| $Li_2O$ | — | 0.51 | 1.22 | — | 0.52 | 0.52 | — |
| Soft. | 844 | 821 | 812 | 843 | 808 | 839 | — |
| Ann. | 656 | 629 | 620 | 644 | 613 | 639 | — |
| Exp. | 60.5 | 58.3 | 55.7 | 56.6 | 55.7 | 52.8 | — |

| | 8 | 9 | 10 | 11 | 12 | 13 |
|---|---|---|---|---|---|---|
| $SiO_2$ | 59.18 | 59.36 | 58.52 | 59.20 | 52.22 | 52.30 |
| $Al_2O_3$ | 6.41 | 6.43 | 6.44 | 6.52 | 5.75 | 5.76 |
| $B_2O_3$ | 5.78 | 5.80 | 5.70 | 5.76 | 5.09 | 5.10 |
| $ZrO_2$ | 6.31 | 6.33 | 6.24 | 6.32 | 5.58 | 5.59 |
| BaO | — | — | — | — | 11.75 | 11.77 |
| SrO | 8.84 | 8.87 | 8.74 | 8.84 | 16.71 | 16.74 |
| CaO | 10.22 | 10.25 | 9.80 | 9.92 | — | — |
| $Na_2O$ | 2.72 | — | 2.64 | 2.67 | 2.36 | — |
| $K_2O$ | — | 1.69 | 1.70 | — | — | 1.52 |
| $Li_2O$ | 0.54 | 1.28 | — | 0.54 | 0.47 | 1.13 |
| F | — | — | 3.16 | 3.20 | — | — |
| Soft. | 811 | 800 | 823 | — | — | — |
| Ann. | 663 | 613 | — | 661 | — | — |
| Exp. | 59.7 | 60.5 | 64.6 | 61.1 | 60.9 | 62.3 |

| | 14 | 15 | 16 | 17 | 18 | 19 | 20 | 21 |
|---|---|---|---|---|---|---|---|---|
| $SiO_2$ | 54.95 | 55.56 | 55.66 | 53.55 | 54.13 | 54.22 | 51.14 | 51.67 |
| $Al_2O_3$ | 6.06 | 6.13 | 6.14 | 5.90 | 5.97 | 5.98 | 5.64 | 5.70 |
| $B_2O_3$ | 5.36 | 5.42 | 5.43 | 5.22 | 5.28 | 5.29 | 4.99 | 5.04 |
| $ZrO_2$ | 5.87 | 5.94 | 5.95 | 5.72 | 5.78 | 5.79 | 5.46 | 5.52 |
| BaO | 12.11 | 12.24 | 12.26 | 11.80 | 11.93 | 11.95 | 11.27 | 11.38 |
| CaO | 9.51 | 9.62 | 9.63 | 9.01 | 9.11 | 9.12 | 8.60 | 8.69 |
| $Na_2O$ | 2.48 | 2.51 | — | 2.42 | 2.45 | — | 2.31 | 2.34 |
| $K_2O$ | 1.60 | — | 1.62 | 1.56 | — | 1.58 | 1.49 | — |
| $Li_2O$ | — | 0.50 | 1.20 | — | 0.49 | 1.17 | — | 0.47 |
| $V_2O_5$ | 1.95 | 1.97 | 1.97 | — | — | — | — | — |
| $Bi_2O_3$ | — | — | — | 4.71 | 4.76 | 4.77 | 9.00 | 9.09 |
| Soft. | — | 810 | 795 | — | — | — | — | — |
| Ann. | — | 620 | 610 | — | — | — | — | — |
| Exp. | 62.2 | 59.5 | 59.4 | — | — | — | — | — |

| | 22 | 23 | 24 | 25 |
|---|---|---|---|---|
| $SiO_2$ | 51.75 | 56.50 | 57.52 | 57.62 |
| $Al_2O_3$ | 5.71 | 6.23 | 6.34 | 6.35 |
| $B_2O_3$ | 5.05 | 5.51 | 5.61 | 5.62 |
| $ZrO_2$ | 5.53 | 6.04 | 6.15 | 6.61 |
| BaO | 11.40 | 6.19 | 6.30 | 6.31 |
| CaO | 8.71 | 9.51 | 9.68 | 9.69 |
| $Na_2O$ | — | 2.55 | 2.60 | — |
| $K_2O$ | 1.50 | 2.60 | — | 1.67 |
| $Li_2O$ | 1.11 | — | 0.83 | 1.55 |
| $Bi_2O_3$ | 9.11 | 4.77 | 4.86 | 4.87 |
| Soft. | — | — | — | — |
| Ann. | — | — | — | — |
| Exp. | — | — | — | — |

As was explained above, the drigaged glass particles were dry ballmilled to a very finely-divided powder. This powder was hand pressed into a cylindrical shape having a height of about 0.5" and a diameter also of about 0.5". Each cylinder was placed upright onto a piece of platinum foil having a thickness of about 0.025", and the foil with the cylinder introduced into an electrically-fired furnace preheated to a desired temperature. After an exposure of ten minutes, the foil with the samples was removed from the furnace and allowed to cool in the ambient atmosphere.

This firing practice causes the frit to fuse and flow into the shape of a button, the diameter of which provides a useful indication of viscous flow. Thus, laboratory experimentation has demonstrated that a button diameter of at least about 1.4 cm (~9/16") is generally required to insure good flow of the fused frit in service and wetting of a particular substrate which is to be coated. The flow buttons were peeled off the foil and then subjected to tests designed to measure resistance to chemical attack. It will be appreciated, of course, that any particular frit-substrate combination would be tested as such for flow and wetting, as well as for the presence of pinholes, change in gloss, crazing, and spalling in the coating.

To investigate the durability of the inventive frits in contact with acids, the fusion buttons were immersed into an aqueous solution containing 10 weight percent citric acid. The buttons were carefully weighed before and after an exposure of 24 hours in a stirred solution held at 96° C. A weight loss of no more than about 0.05% was deemed to define good resistance to attack by acids. A visual inspection of the samples was conducted for any change in gloss or other surface defect.

To ascertain the resistance of the frits to bases, each of the fusion buttons was subjected to a test devised to indicate the durability of the frits against alkaline detergents of the type used in commercial dishwashers. Thus, weighed buttons were immersed into a 0.3% by weight aqueous solution of an alkaline detergent marketed by Economics Laboratories, St. Paul, Minn., under the mark Super Soilax. The immersion was undertaken for 24 hours with the solution at 96° C. Thereafter, the buttons were removed from the solution, rinsed in tap water, dried, examined visually, and re-weighed to measure any weight loss. The immersion period of 24 hours at 96° C. was believed to simulate an accelerated equivalent of several years' actual use in food service applications. No visual change in appearance, coupled with a weight loss of no more than 0.02%, is considered to evidence excellent detergent resistance.

Table II recites the firing temperatures (°C.) employed with the exemplary compositions of Table I, the % weight loss after 24 hours in the citric acid solution, and the % weight loss after 24 hours in the detergent solution along with a visual examination noting any change in glossy appearance.

TABLE II

| Ex. No. | Firing Temp. | % Loss Citric Acid | Change of Gloss | % Loss Detergent | Change of Gloss |
|---|---|---|---|---|---|
| 1 | 950° | 0.02 | None | 0 | None |
| 2 | 900° | 0.01 | " | 0 | " |
| 3 | 900° | 0.01 | " | 0 | " |
| 4 | 950° | 0.01 | " | 0.0003 | " |
| 5 | 900° | 0.03 | " | 0 | " |
| 6 | 950° | 0.02 | " | 0.022 | " |
| 7 | 900° | 0.02 | " | 0 | " |
| 8 | 875° | 0.02 | " | 0 | " |
| 9 | 850° | 0.03 | " | 0.004 | " |
| 10 | 925° | 0.04 | " | 0.005 | " |
| 11 | 875° | 0.05 | " | 0.003 | " |
| 12 | 875° | 0.01 | " | 0.003 | " |
| 13 | 850° | 0.02 | " | 0.01 | " |
| 14 | 900° | 0.03 | " | 0.007 | " |
| 15 | 875° | 0.04 | " | 0.04 | " |
| 16 | 850° | 0.04 | " | 0.008 | " |
| 17 | 900° | 0.002 | " | 0.02 | " |
| 18 | 875° | 0.003 | " | 0.02 | " |
| 19 | 850° | 0.003 | " | 0.02 | " |
| 20 | 900° | 0 | " | 0.01 | " |
| 21 | 875° | 0.004 | " | 0.02 | " |
| 22 | 875° | 0.001 | " | 0.02 | " |
| 23 | 900° | 0.001 | " | 0.01 | " |
| 24 | 875° | 0.002 | " | 0.007 | " |
| 25 | 875° | 0.002 | " | 0.01 | " |

It is apparent from Table II that each frit demonstrated excellent resistance to attack by both acids and bases and exhibited no change in gloss following exposure to the tests. This latter circumstance is of significance where decorative glazes and enamels are desired. Thus, glazes have been produced which exhibit very low weight loss upon immersion into acids and bases, but which display a very dull finish thereafter. Such products would have no utility where highly decorative food service ware is concerned.

To investigate the applicability of the invention frits when applied to commercially-marketed food service ware, the compositions of Table I were fritted, ground to pass a No. 325 U.S. Standard Sieve, hand sprayed onto the surface of the ware, and then fired to maturity.

For example, the powdered frit of Example 1 was sprayed onto dinner plates formed from glass-ceramic compositions of the type disclosed in U.S. Pat. No. 3,201,266, having a coefficient of thermal expansion (0°–300° C.) of about $97 \times 10^{-7}/°C.$, and then fired at 950° C. for 60 minutes. The resultant glaze showed good gloss and easily passed both the acid and detergent tests. The lower coefficient of thermal expansion intrinsic to the frit of Example 1 effected a substantial increase in the mechanical strength of the tableware.

On the basis of an overall combination of appearance and physical properties, the most preferred compositions are Examples 1 and 8 of Table I.

I claim:

1. A frit essentially free from cadmium and lead demonstrating good glass stability, a coefficient of thermal expansion (20°–300° C.) between about $52-65 \times 10^{-7}/°C.$, a viscosity suitable for firing at about 850°–1100° C., and excellent resistance to attack by acids and bases as evidenced by no visual change in appearance and a weight loss of no more than about 0.05% after an exposure of 24 hours at 96° C. to a stirred aqueous solution containing 10% by weight citric acid and by no visual change in appearance and a weight loss of no more than 0.02% after an exposure of 24 hours at 96° C. to an aqueous solution containing 0.3% by weight alkaline detergent, said frit consisting essentially, expressed in weight percent on the oxide basis as calculated from the batch, of

| | |
|---|---|
| $SiO_2$ | 51–60 |
| $B_2O_3$ | 4.5–8 |
| BaO | 0–13 |
| SrO | 0–18 |
| BaO + SrO | 6–30 |
| $ZrO_2$ | 4–8 |
| $Al_2O_3$ | 5–8 |
| $Li_2O$ | 0–4 |
| $Na_2O$ | 0–5 |
| $K_2O$ | 0–5 |
| $Li_2O + Na_2O + K_2O$ | 1–5 |
| MgO | 0–6 |
| CaO | 0–12 |
| $Bi_2O_3$ | 0–10 |
| $MgO + CaO + Bi_2O_3$ | 0–20 |

2. A frit according to claim 1 exhibiting a coefficient of thermal expansion (20°–300° C.) between about $52-60 \times 10^{-7}/°C.$ and a viscosity suitable for firing at about 850°–950° C. consisting essentially, expressed in weight percent on the oxide basis, as calculated from the batch, of

| | |
|---|---|
| $SiO_2$ | 56–60 |
| $B_2O_3$ | 4.5–6.5 |
| BaO | 0–13 |
| SrO | 0–16 |
| BaO + SrO | 6–16 |
| $ZrO_2$ | 4.5–7 |
| $Al_2O_3$ | 5–7 |
| $Li_2O$ | 0–2 |
| $Na_2O$ | 0–3 |
| $K_2O$ | 0–2 |
| $Li_2O + Na_2O + K_2O$ | 2–4.5 |
| MgO | 0–4 |
| CaO | 0–12 |
| MgO + CaO | 0–12 |

* * * * *